US012333333B2

(12) United States Patent
He

(10) Patent No.: US 12,333,333 B2
(45) Date of Patent: Jun. 17, 2025

(54) TASK SCHEDULING METHOD AND APPARATUS

(71) Applicant: Shenzhen Yinwang Intelligent Technologies Co., Ltd., Shenzhen (CN)

(72) Inventor: Qijian He, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 387 days.

(21) Appl. No.: 17/957,940

(22) Filed: Sep. 30, 2022

(65) Prior Publication Data

US 2023/0025917 A1  Jan. 26, 2023

Related U.S. Application Data

(63) Continuation of application No. PCT/CN2020/082729, filed on Apr. 1, 2020.

(51) Int. Cl.
 *G06F 9/48* (2006.01)

(52) U.S. Cl.
 CPC .................. *G06F 9/4881* (2013.01)

(58) Field of Classification Search
 CPC .......... G06F 9/4881; G06F 3/0659; G06F 2003/0697; G06F 3/126; G06F 9/43836
 See application file for complete search history.

(56) References Cited

U.S. PATENT DOCUMENTS

| 8,566,633 | B2 * | 10/2013 | Fuhrman | G05B 19/0428 |
| | | | | 714/4.11 |
| 8,566,804 | B1 * | 10/2013 | Carrick | G06F 9/5066 |
| | | | | 703/22 |
| 8,990,783 | B1 * | 3/2015 | Yu | G06F 9/30 |
| | | | | 703/22 |

(Continued)

FOREIGN PATENT DOCUMENTS

| CN | 103257904 A | 8/2013 |
| CN | 106897132 A | 6/2017 |

(Continued)

OTHER PUBLICATIONS

Wang et al., "Generation of Schedule Tables on Multi-core Systems for Autosar Applications," 2016 Conference on Design and Architectures for Signal and Image Processing (DASIP), Total 8 pages, Institute of Electrical and Electronics Engineers, New York, New York (Oct. 12-14, 2016).

(Continued)

*Primary Examiner* — Van H Nguyen
(74) *Attorney, Agent, or Firm* — Leydig, Voit & Mayer, Ltd.

(57) ABSTRACT

A task scheduling method and an apparatus that belongs to the field of intelligent vehicles is provided. The method may be applied to an embedded device using AUTomotive Open System Architecture (AUTOSAR), the embedded device includes a memory and a processor, the memory stores an interface function, and a first software component and a second software component are deployed in the processor. In this solution, registration information of a to-be-deployed algorithm may be obtained and parsed by using the interface function, and a task in the algorithm may be scheduled and executed by using the software component.

17 Claims, 10 Drawing Sheets

(56) References Cited

U.S. PATENT DOCUMENTS

| | | | |
|---|---|---|---|
| 9,135,065 B1 | 9/2015 | Stefansson | |
| 10,196,069 B2* | 2/2019 | Satyavolu | G06F 9/45533 |
| 10,216,542 B2* | 2/2019 | Wang | G06F 9/50 |
| 10,452,432 B2* | 10/2019 | Lim | G06F 3/0659 |
| 10,452,605 B2* | 10/2019 | Wang | G06F 9/48 |

FOREIGN PATENT DOCUMENTS

| | | |
|---|---|---|
| CN | 109445926 A | 3/2019 |
| CN | 109743390 A | 5/2019 |

OTHER PUBLICATIONS

Xie, "Research on Multiple DAGs Scheduling of Heterogeneous Networked Embedded Systems for Automotive," Hunan University, Issue 03, Total 138 pages (2019). With an English Abstract.

Wang et al., "Optimizing Application Distribution on Multi-Core Systems within Autosar," 8th European Congress on Embedded Real Time Software and Systems (ERTS 2016), HAL Id: hal-01289485, Total 11 pages, HAL open science (Submitted on Mar. 16, 2016).

Xie et al., "Optimal configuration algorithm for static segment of FlexRay," Journal on Communications, doi:10.3969/j.issn.1000-436x.2012.11.005, vol. 33, No. 11, Total 8 pages (Nov. 2012). With an English Abstract.

Nasri et al., "Response-Time Analysis of Limited-Preemptive Parallel DAG Tasks Under Global Scheduling," 31st Euromicro Conference on Real-Time Systems (ECRTS 2019), Article No. 21, Leibniz International Proceedings in Informatics, Schloss Dagstuhl—Leibniz-Zentrum für Informatik, Dagstuhl Publishing, Germany, https://www.es.ele.tue.nl/~m.nasri/papers/Nasri_ECRTS19.pdf, Total 23 pages (2019).

* cited by examiner

TASK SCHEDULING METHOD AND APPARATUS

CROSS-REFERENCE TO RELATED APPLICATIONS

This application is a continuation of International Application No. PCT/CN2020/082729, filed on Apr. 1, 2020, the disclosure of which is hereby incorporated by reference in its entirety.

TECHNICAL FIELD

This application relates to the field of intelligent vehicles, and in particular, to a task scheduling method and an apparatus.

BACKGROUND

AUTomotive Open System ARchitecture (AUTOSAR) is an open and standardized software architecture developed for an automotive industry.

In a related technology, when an algorithm needs to be deployed in AUTOSAR to implement a function of the algorithm, a developer needs to perform a series of configuration on the algorithm by using a system configuration tool, an electronic control unit (ECU) configuration tool, and a code generation tool of AUTOSAR, and finally, an executable file used to implement the function of the algorithm is generated.

However, in the related technology, a procedure of implementing the function of the algorithm by using AUTOSAR is relatively complex, and efficiency is relatively low.

SUMMARY

Embodiments of this application provide a task scheduling method and an apparatus, to resolve problems that a procedure of implementing a function of an algorithm by using AUTOSAR is relatively complex and efficiency is relatively low in a related technology.

According to one aspect, this application provides a task scheduling method. The method may be applied to an embedded device using AUTOSAR, the embedded device includes a memory and a processor, the memory stores an interface function, and a first software component and a second software component are deployed in the processor; and the method may include: The interface function obtains registration information of a to-be-deployed algorithm. The algorithm includes a plurality of tasks, and the registration information includes: configuration information of each task and relational data used to describe a dependency between the plurality of tasks. The interface function generates a dependency graph of the plurality of tasks based on the relational data. The dependency graph includes a plurality of nodes, and each node is used to indicate one task. The interface function further records, in the memory, a mapping relationship between each node in the dependency graph and configuration information of a task indicated by the node, to obtain an execution flow graph of the algorithm. Then, the first software component may create an algorithm instance based on the execution flow graph, and may schedule a target task that meets a scheduling condition in the plurality of tasks included in the algorithm to the second software component. The second software component may further execute the target task.

According to the method provided in this application, the registration information of the algorithm may be obtained and parsed by using the interface function, and the task in the algorithm may be scheduled and executed by using the software component deployed in the processor. In a process of deploying the algorithm and scheduling and executing the task, a developer does not need to perform complex configuration, so that an algorithm deployment procedure is effectively simplified, and algorithm deployment efficiency and task scheduling and execution efficiency are improved.

Optionally, a process in which the first software component creates the algorithm instance based on the execution flow graph may include: if the first software component determines that the first software component meets an instance creation condition, creating the algorithm instance based on the execution flow graph. The instance creation condition may include one or more of the following conditions:

a total quantity of created instances of the first software component is less than a quantity threshold; and the embedded device has a resource used to execute the task in the algorithm.

The quantity threshold may be equal to 1 or may be an integer greater than 1. If the quantity threshold is an integer greater than 1, the first software component may create a plurality of algorithm instances in parallel, and the second software component may execute tasks in the plurality of algorithm instances in parallel. Therefore, a scheduling delay of the algorithm instance is effectively reduced, an execution period of the algorithm instance is shortened, and utilization of hardware resources of the embedded device is improved.

Optionally, a plurality of second software components may be deployed in the processor; and a process in which the first software component schedules, based on the algorithm instance, the target task that meets the scheduling condition in the plurality of tasks included in the algorithm to the second software component may include: The first software component determines, based on the algorithm instance and from the plurality of tasks included in the algorithm, an identifier of the target task that meets the scheduling condition, and determines, based on the identifier of the target task and from the plurality of second software components, a target second software component configured to execute the target task, and then the first software component may send the identifier of the target task to the target second software component. The target second software component may further execute the target task based on the identifier of the target task.

The first software component may schedule the target task to the pre-deployed second software component for execution, and does not need to create a process or a thread in real time to execute the target task. Therefore, a task scheduling delay can be effectively shortened.

Optionally, the method may further include: The second software component sends a notification message to the first software component after the second software component executes the target task. The notification message is used to indicate that the target task is executed. The first software component may further update a status of the target task to a finish state in response to the notification message.

Communication between different software components may be implemented based on a running environment layer in AUTOSAR.

Optionally, before the first software component schedules the target task that meets the scheduling condition to the second software component, the method may further include: The first software component detects, based on the algorithm instance and in response to the notification message, whether the target task that meets the scheduling condition exists in the plurality of tasks included in the algorithm.

In the solution provided in this application, the first software component may periodically execute task scheduling based on a scheduling period; or may actively trigger next task scheduling in response to the notification message sent by the second software component without waiting for a next scheduling period, so that task scheduling efficiency can be effectively improved.

Optionally, the scheduling condition may include: the embedded device has the resource required to execute the task, and a status of a task on which the task depends is a finish state.

Optionally, the configuration information may include: attribute information of each task and scheduling information of each task; and a process in which the interface function generates the execution flow graph of the algorithm may include:

The interface function first records, in the memory, a mapping relationship between each node in the dependency graph and the attribute information of the task indicated by the node, to obtain a task flow graph of the algorithm; and then records, in the memory, a mapping relationship between each node in the task flow graph and the scheduling information of the task indicated by the node, to obtain the execution flow graph of the algorithm.

The interface function may directly store, in the memory, the execution flow graph obtained through parsing, so that the first software component may directly query the memory for data in the execution flow graph when creating the algorithm instance, without a need to parse a file. Therefore, a task scheduling delay is effectively reduced.

According to another aspect, an embedded device is provided. The embedded device uses AUTOSAR, the embedded device includes a memory and a processor, the memory stores an interface function, and a first software component and a second software component are deployed in the processor; and the interface function, the first software component, and the second software component may be used to implement the task scheduling method provided in the foregoing aspect.

According to still another aspect, a computer-readable storage medium is provided. The computer-readable storage medium stores instructions, and when the computer-readable storage medium is run on an embedded device, the embedded device is enabled to perform the task scheduling method provided in the foregoing aspect.

According to yet another aspect, a chip is provided. The chip includes a programmable logic circuit and/or program instructions, and when running, the chip is configured to implement the task scheduling method provided in the foregoing aspect.

The technical solutions provided in this application include at least the following beneficial effects:

Embodiments of this application provide a task scheduling method and an apparatus. In this solution, registration information of an algorithm may be obtained and parsed by using an interface function, and a task in the algorithm may be scheduled and executed by using a software component deployed in a processor. In a process of deploying the algorithm and scheduling the task, a developer does not need to perform complex configuration, so that an algorithm deployment procedure is effectively simplified, and algorithm deployment efficiency and task scheduling efficiency are improved.

In addition, the interface function may directly store, in a memory, an execution flow graph obtained through parsing, so that a software component may directly query the memory for data in the execution flow graph when creating an algorithm instance, without a need to parse a file. Therefore, a task scheduling delay is effectively reduced. Moreover, the software component configured to implement task scheduling and execution may be pre-deployed in the processor, and the processor does not need to create a process or a thread during running. Therefore, the task scheduling delay can also be effectively reduced.

DESCRIPTION OF EMBODIMENTS

To make the objectives, technical solutions, and advantages of this application clearer, the following further describes the implementations of this application in detail with reference to the accompanying drawings.

In a related technology, if an algorithm needs to be deployed in AUTOSAR to implement a function of the algorithm, the following configuration procedure needs to be performed: First, a developer uses a system configuration tool of AUTOSAR to finish design of a software component (SWC) and design of an interaction port between SWCs, to generate an SWC description file related to the algorithm. Then, an electronic control unit (ECU) configuration tool of AUTOSAR is used to map runnable entities in a generated SWC to different operating system tasks (OS Task), and the developer needs to manually configure an attribute of the OS Task, to obtain a plurality of configuration files. Finally, the plurality of configuration files are converted into code by using a code generation tool, and an executable file used to implement the function of the algorithm can be generated by compiling and linking the code. The procedure of the configuration process is complex and requires the developer to master an entire AUTOSAR development tool chain. Consequently, this causes relatively low efficiency.

Figure 1:
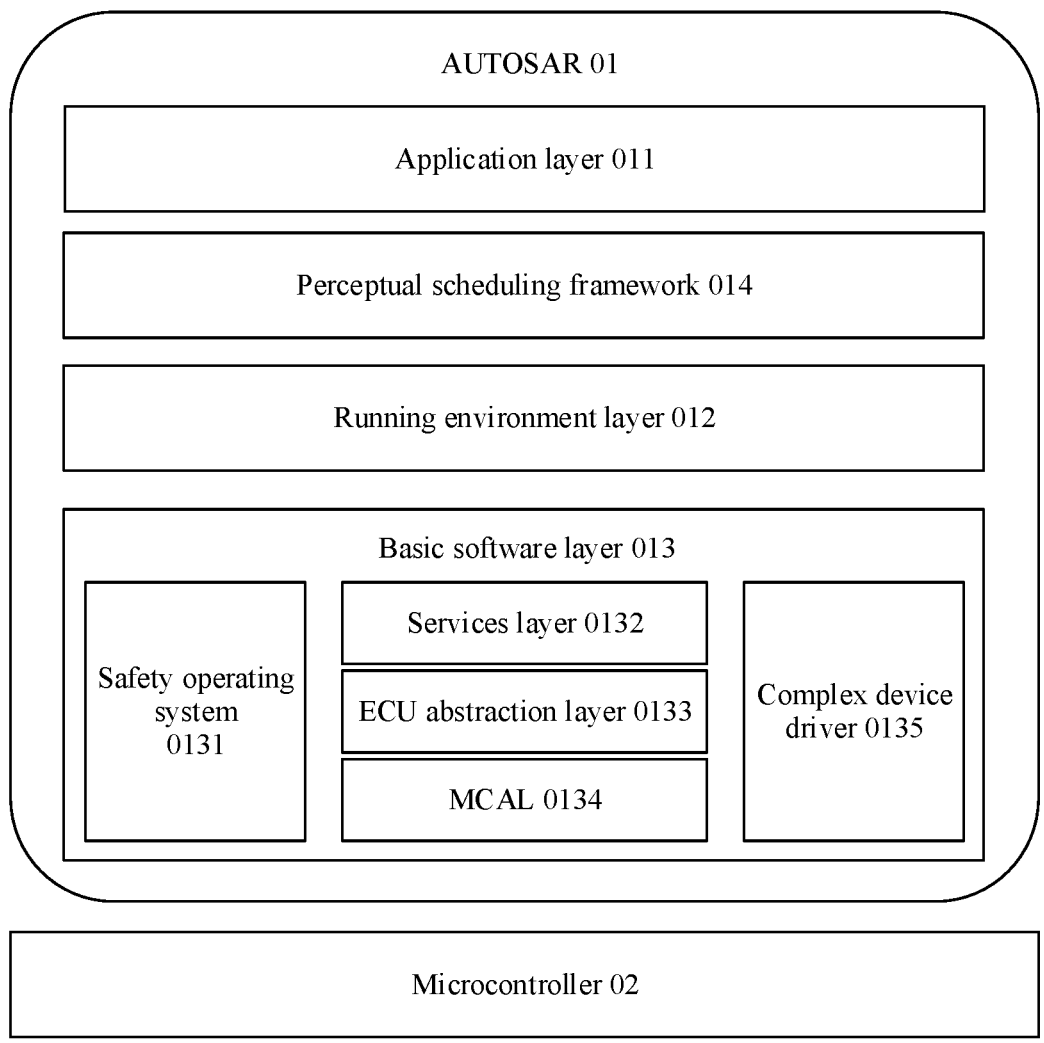
FIG. 1 is an architectural diagram of AUTOSAR used in an embedded device, according to an embodiment of this application.

FIG. 1 is an architectural diagram of AUTOSAR used in an embedded device according to an embodiment of this application. As shown in FIG. 1, AUTOSAR 01 may include an application layer 011, a runtime environment (RTE) layer 012, and a basic software (BSW) layer 013 that runs on a microcontroller 02. Moreover, in addition to the foregoing three layers, AUTOSAR 01 may further include a perceptual scheduling framework 014 between the application layer 011 and the RTE layer 012.

The PSF 014 may manage scheduling and execution of a task in an upper-layer algorithm (which may also be referred to as a service) in a unified manner. The upper-layer algorithm does not need to pay attention to how SWCs communicate with each other and how the task is scheduled and executed, so that the algorithm is decoupled from AUTOSAR 01. Therefore, problems of a long procedure and relatively low efficiency of deploying the algorithm in AUTOSAR 01 can be resolved.

Refer to FIG. 1. It can be further learned that the BSW layer 013 may include a safety operating system (safety OS) 0131, a services layer 0132, an ECU abstraction layer 0133, a microcontroller abstraction layer 0134, and a complex device driver 0135.

Figure 2:
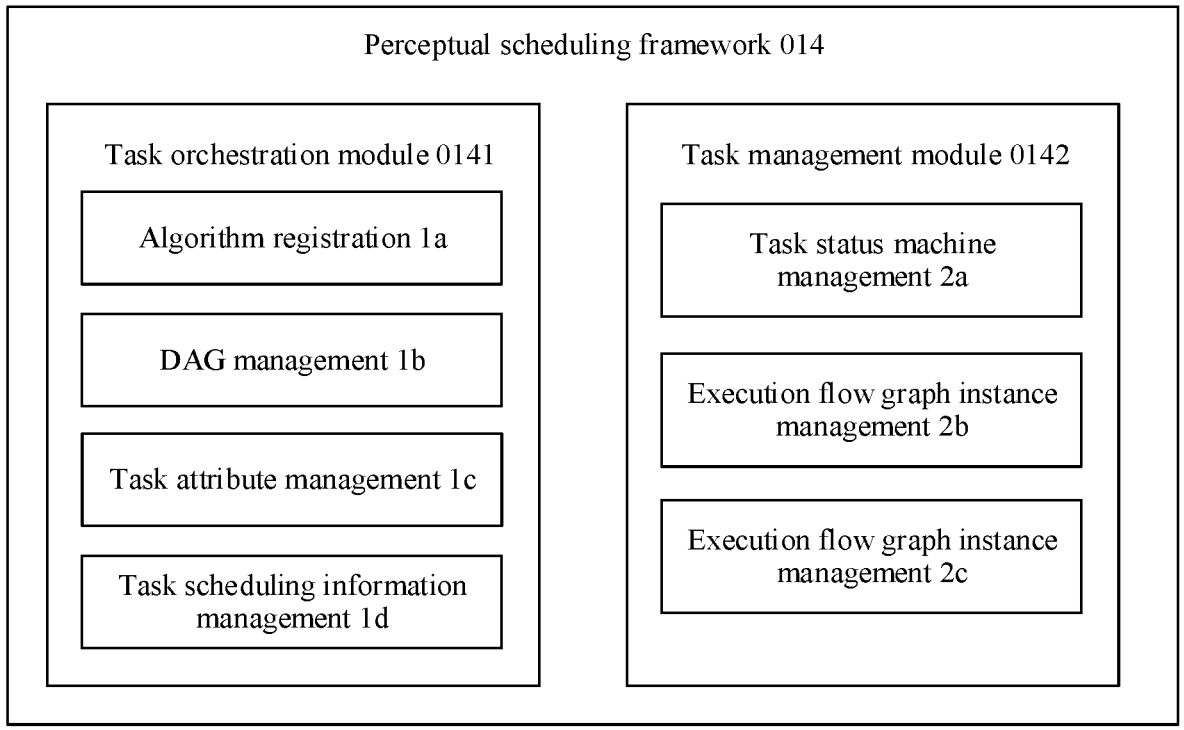
FIG. 2 is a schematic diagram of a function structure of a perceptual scheduling framework, according to an embodiment of this application.

FIG. 2 is a schematic diagram of a function structure of the PSF 014 according to an embodiment of this application. As shown in FIG. 2, the PSF 014 may include two function modules: a task orchestration (TO) module 0141 and a task management (TM) module 0142.

The task orchestration module 0141 is mainly configured to implement static orchestration of a task included in a to-be-deployed algorithm. Refer to FIG. 2. The task orchestration module 0141 may include the following four submodules.

An algorithm registration submodule 1a is responsible for implementing algorithm registration, that is, obtaining registration information of the algorithm, and parsing and transferring the registration information to another submodule. The algorithm may include a plurality of tasks. The registration information of the algorithm may include configuration information of each task and relational data used to describe a dependency between the plurality of tasks. The configuration information may include attribute information of the task, resource dependency information of the task, scheduling constraint information of the task, and the like.

Because AUTOSAR does not support a file system, a common manner in which the registration information is obtained based on a parsed file is infeasible. Therefore, in this embodiment of this application, a memory-based configuration table is used to implement the algorithm registration, and a speed of parsing the registration information is improved.

A directed acyclic graph (DAG) management submodule 1b is responsible for parsing an execution dependency between the plurality of tasks included in the algorithm, and generating a DAG used to describe a dependency between the plurality of tasks. Because an in-vehicle scenario has a high requirement on real-time performance, a conventional manner in which the dependency is parsed by reading a configuration file becomes unrealistic. Therefore, in this embodiment of this application, the DAG is used to store the dependency between the tasks in a memory.

A task attribute management submodule 1c is responsible for parsing attribute information of each task included in the algorithm, and associating the attribute information of the task with a corresponding task node in the DAG, to generate a task flow graph (TFG) having the task attribute information. The attribute information of the task may include a task name and a storage address of the task. In this embodiment of this application, each task may include one or more functions used to implement a specific function, the task name is a function name, the storage address of the task is a storage address of the function, and the storage address may be represented by using a function pointer.

A task scheduling information management submodule 1d is responsible for parsing scheduling information of the task included in the algorithm, and associating the scheduling information with a corresponding node in the TFG, to generate an execution flow graph (EFG) that can be scheduled and executed by the task management module 0142. In addition, the task scheduling information management submodule 1d may provide an interface for obtaining the EFG for the task management module 0142. The scheduling information may include the resource dependency information and the scheduling constraint information of the task. The resource dependency information may include a memory on which the task depends, and an identifier of a computing unit that is in a processor and that is used to execute the task. The scheduling constraint information may include a start time of the task and maximum running duration after the task is started.

The task management module 0142 is mainly configured to implement dynamic management of the task. As shown in FIG. 2, the task management module 0142 may include the following three submodules.

A task status machine management submodule 2a is configured to manage state transition of each task in the algorithm.

An execution flow graph instance management submodule 2b is configured to: create and delete an execution flow graph instance, and parse a resource on which a task in the execution flow graph depends.

An execution flow graph instance scheduling submodule 2c is configured to properly schedule task execution based on the state transition of the task.

Figure 3:
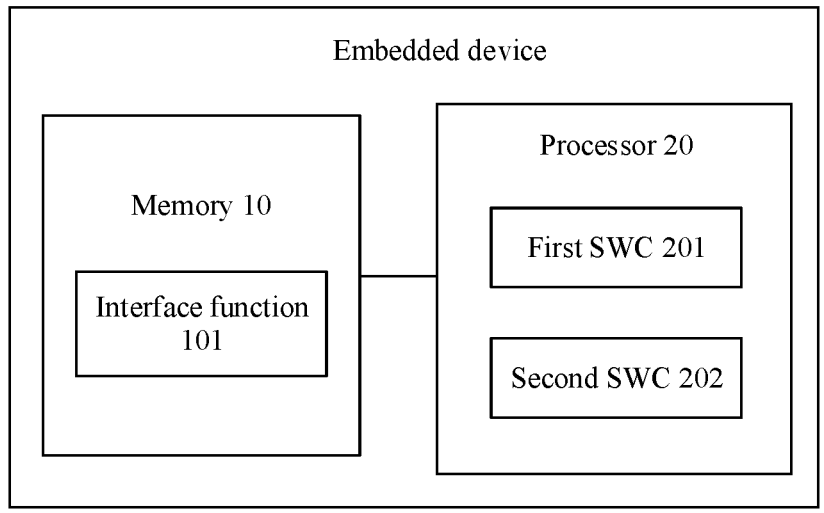
FIG. 3 is a schematic diagram of a structure of an embedded device using AUTOSAR, according to an embodiment of this application.

FIG. 3 is a schematic diagram of a structure of an embedded device using AUTOSAR according to an embodiment of this application. The embedded device may be an in-vehicle device, and may be applied to an intelligent vehicle, a connected vehicle, or a new energy vehicle. As shown in FIG. 3, the embedded device may include a memory 10 and a processor 20. The memory 10 stores an interface function 101, and a first SWC 201 and a second SWC 202 are deployed in the processor 20. The processor 20 may be the microcontroller shown in FIG. 1, or may be referred to as a microcontroller unit (MCU). The interface function 101 may be used to implement the function of the task orchestration module 0141 in the PSF 014. The first SWC 201 may be configured to implement the function of the task management module 0142 in the PSF 014, that is, the first SWC 201 is mainly configured to implement task scheduling. Therefore, the first SWC 201 may also be referred to as a scheduling SWC or a master SWC. The second SWC 202 is configured to execute a task. Therefore, the second SWC 202 may also be referred to as a worker SWC.

According to the embedded device provided in this embodiment of this application, task scheduling and execution may be implemented by using the first SWC and the second SWC that are pre-deployed in the processor, so that the processor does not need to create a process or a thread in real time during running to schedule and execute a task. Therefore, a task scheduling delay is effectively reduced.

Figure 4A:
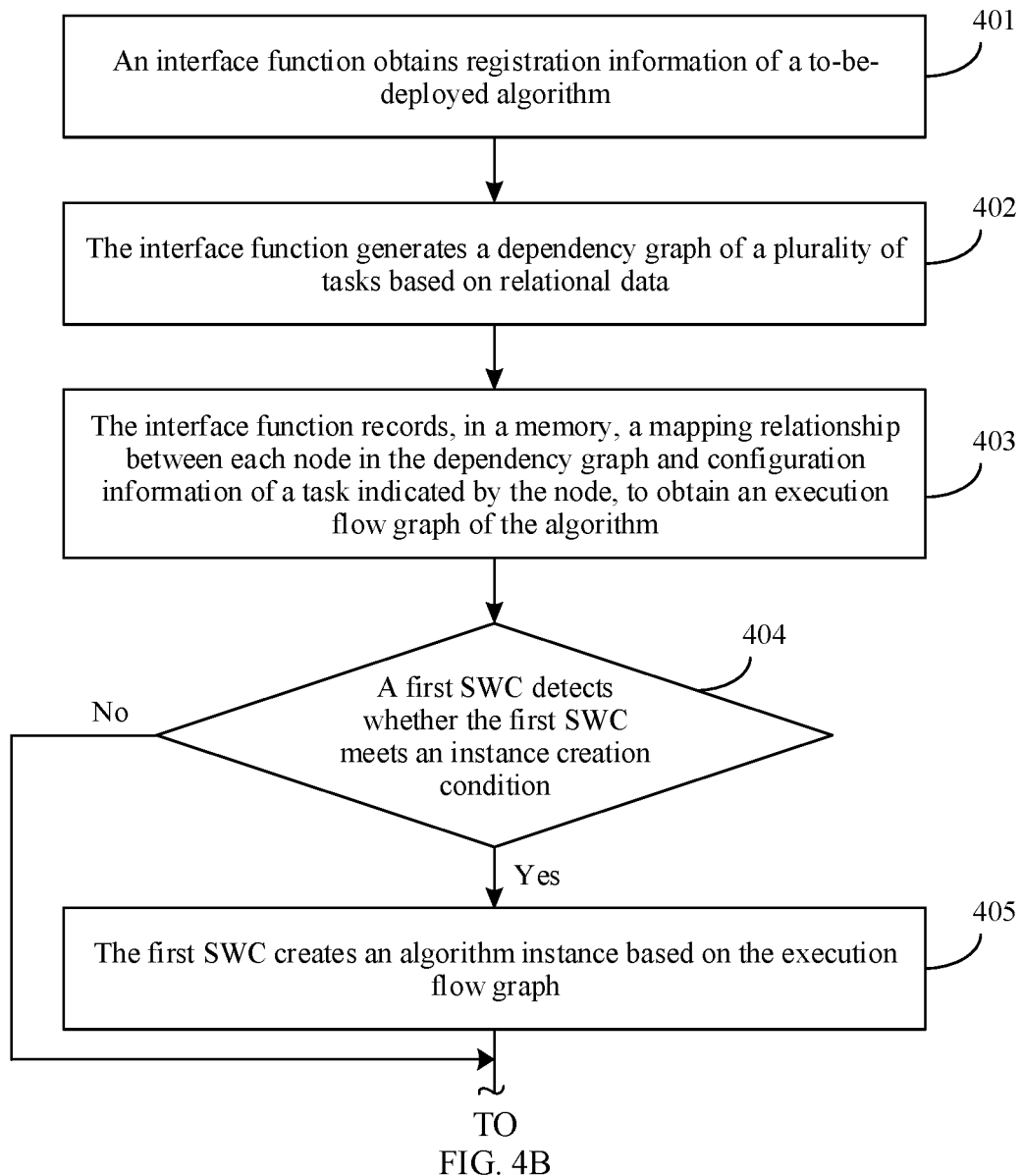
FIG. 4A and FIG. 4B are a flowchart of a task scheduling method, according to an embodiment of this application.
Figure 4B:
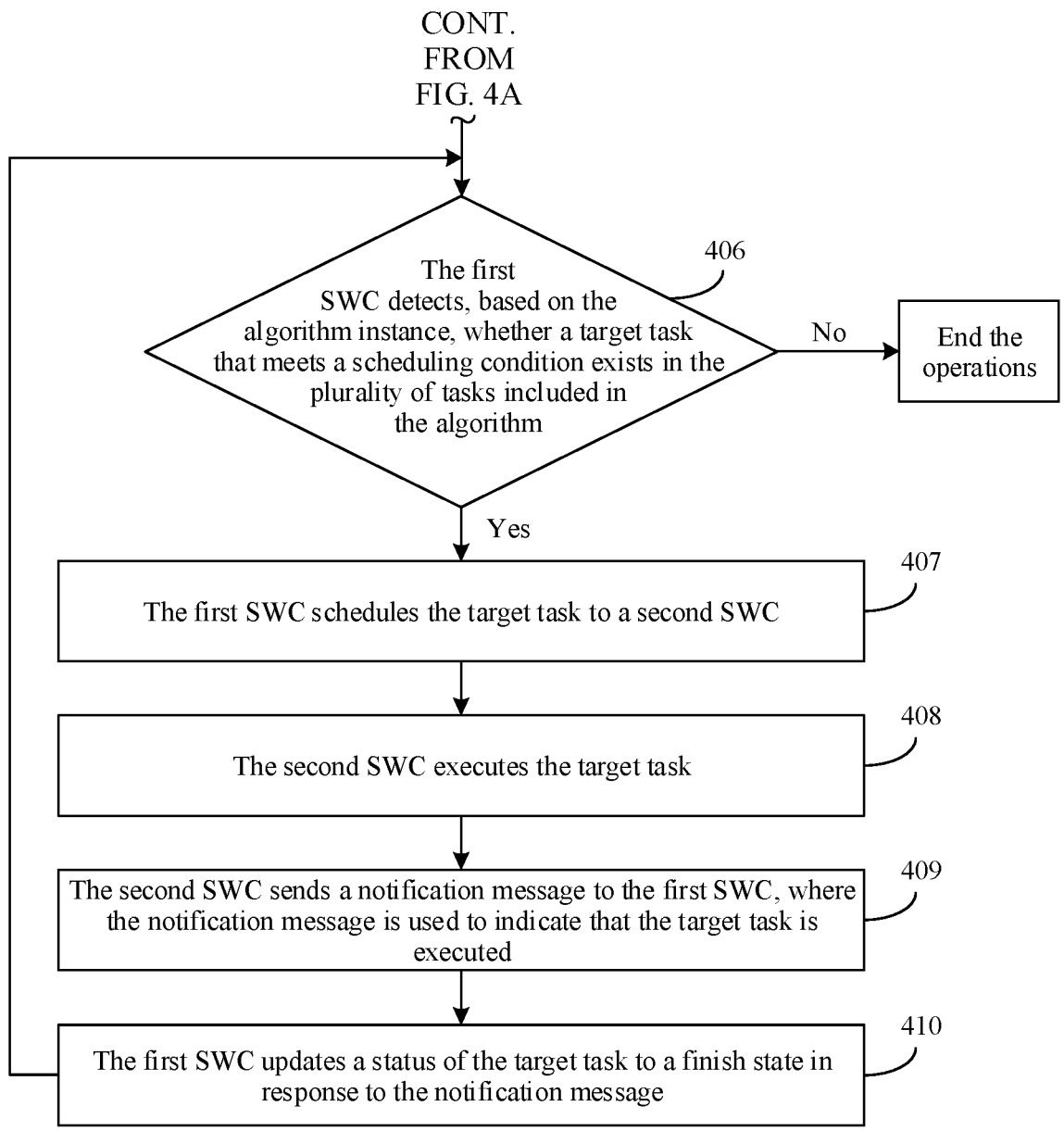

FIG. 4A and FIG. 4B are a flowchart of a task scheduling method according to an embodiment of this application. The method may be applied to the embedded device shown in FIG. 3. With reference to FIG. 4A and FIG. 4B, the method includes the following steps.

Step 401: An interface function obtains registration information of a to-be-deployed algorithm.

The algorithm may include a plurality of tasks, and the registration information may include: configuration information of each task and relational data used to describe a dependency between the plurality of tasks. The configuration information may include attribute information of the task, resource dependency information of the task, scheduling constraint information of the task, and the like.

The attribute information of the task may include a task name and a storage address of the task. In this embodiment of this application, each task may include one or more functions used to implement a specific function, the task name is a function name, the storage address of the task is a storage address of the function, and the storage address may be represented by using a function pointer. In addition, the plurality of tasks included in the algorithm may be stored in a memory of the embedded device.

Scheduling information may include the resource dependency information and the scheduling constraint information of the task. The resource dependency information may include a memory on which the task depends, and an identifier of a computing unit that is in the processor and that is used to execute the task. The scheduling constraint information may include a start time of the task and maximum running duration after the task is started.

Optionally, in this embodiment of this application, the to-be-deployed algorithm may be an algorithm related to an advanced driver assistance system (ADAS), for example, may be a millimeter-wave radar algorithm, and the millimeter-wave radar algorithm may be used to implement functions such as detection (for example, distance detection, speed detection, or obstacle detection) and tracking.

It should be noted that, after the embedded device is started, the processor may start to run the interface function in the memory, and the interface function may further implement the method shown in step 401.

Step 402: The interface function generates a dependency graph of the plurality of tasks based on the relational data.

After obtaining the registration information, the interface function may parse the relational data in the registration information, and generate the dependency graph that can reflect the dependency between the plurality of tasks. The dependency graph may include a plurality of nodes, and each node is used to indicate one task. The dependency graph generated by the interface function may be a DAG. In addition, the dependency graph may be represented by using an adjacency list or an adjacency matrix, that is, the dependency graph may be stored in the adjacency list or the adjacency matrix.

Figure 5:
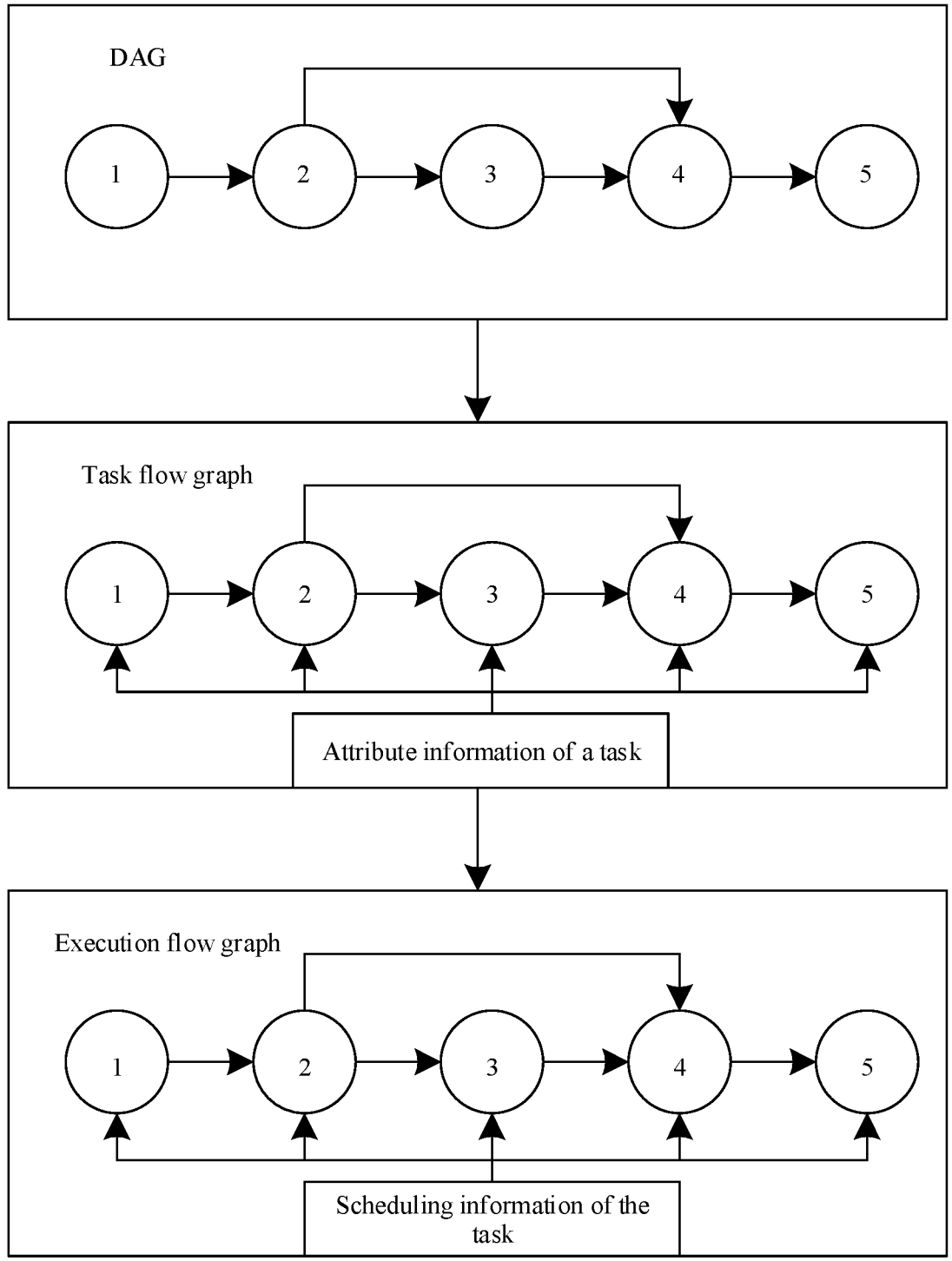
FIG. 5 is a schematic diagram of generating an execution flow graph, according to an embodiment of this application.

For example, as shown in FIG. 5, it is assumed that the algorithm includes five tasks in total: a task 1 to a task 5. A dependency between the five tasks is as follows: The task 1 has no dependency task (that is, the task 1 is the first task in the algorithm), the task 2 depends on the task 1, the task 3 depends on the task 2, the task 4 depends on the task 2 and the task 3, and the task 5 depends on the task 4. In this case, the interface function may generate a DAG shown in FIG. 5 by parsing the dependency of the five tasks.

Step 403: The interface function records, in the memory, a mapping relationship between each node in the dependency graph and configuration information of a task indicated by the node, to obtain an execution flow graph of the algorithm.

The interface function may record the mapping relationship between each node and the configuration information of the task indicated by the node, and associate each node with the configuration information of the task indicated by the node, to obtain the execution flow graph of the algorithm.

In this embodiment of this application, the embedded device usually does not support a file system. Therefore, the interface function may directly store the execution flow graph in the memory by using a target data structure. The target data structure may be a JSON (JavaScript object notation, JS object notation) data structure or an extensible markup language (XML) data structure. Compared with a related technology in which the configuration information of each task and a dependency graph of tasks are stored in a disk in a configuration file manner, this directly stores the execution flow graph in the memory based on the target data structure. Because no file parsing is required, efficiency of reading the execution flow graph can be effectively improved, so that a scheduling delay of a task is reduced. For example, the scheduling delay of the task may be reduced to a microsecond (us) level.

Figure 6:
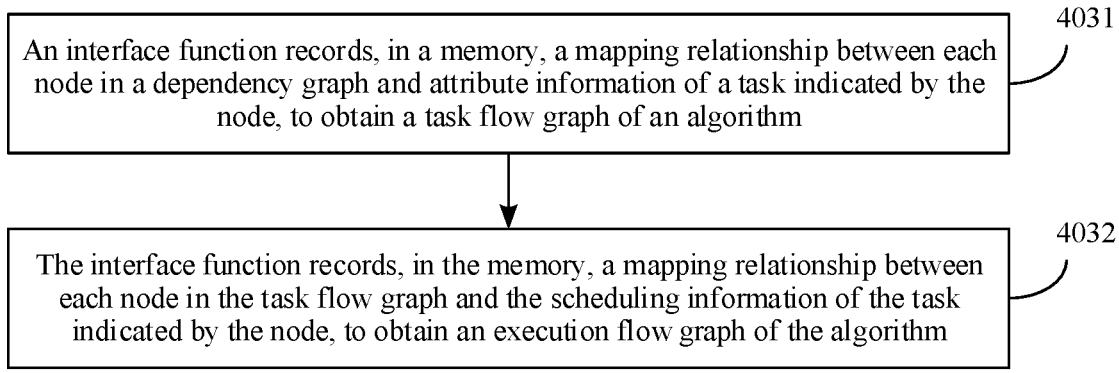
FIG. 6 is a flowchart of a method for generating an algorithm execution flow graph, according to an embodiment of this application.

Optionally, as described above, the configuration information of each task may include attribute information of each task and scheduling information of each task. Correspondingly, as shown in FIG. 6, a process of generating the execution flow graph of the algorithm may include the following steps.

Step 4031: The interface function records, in the memory, a mapping relationship between each node in the dependency graph and the attribute information of the task indicated by the node, to obtain a task flow graph of the algorithm.

As shown in FIG. 5, the interface function may first associate each node in the dependency graph with the attribute information of the task indicated by the node, to obtain the task flow graph of the algorithm.

Step 4032: The interface function records, in the memory, a mapping relationship between each node in the task flow graph and the scheduling information of the task indicated by the node, to obtain the execution flow graph of the algorithm.

Still as shown in FIG. 5, the interface function may associate each node in the task flow graph with the scheduling information of the task indicated by the node, to obtain the execution flow graph that can be scheduled by a first SWC deployed in the processor.

It should be noted that, in this embodiment of this application, the mapping relationship recorded in the memory by the interface function may be represented by using a mapping table, that is, the mapping relationship may be stored in the memory by using the mapping table.

Step 404: The first SWC detects whether the first SWC meets an instance creation condition.

In this embodiment of this application, the first SWC deployed in the processor may periodically run based on a preset scheduling period, that is, the processor may periodically trigger the first SWC based on the scheduling period. After the first SWC starts to run, it may be first detected whether the instance creation condition is met currently. If the first SWC determines that the instance creation condition is met, step 405 may continue to be performed; or if the first SWC determines that the instance creation condition is not met, step 406 may be performed.

The instance creation condition may include one or more of the following conditions:

a total quantity of created instances of the first SWC is less than a quantity threshold, where the quantity threshold is an upper limit of a quantity of instances that can be run in parallel by the processor of the embedded device; and the embedded device has a resource used to execute the task in the algorithm.

In an optional implementation, the first SWC may schedule an algorithm instance in serial, that is, only a task in one algorithm instance can be executed in each scheduling period. In this implementation, the quantity threshold may be 1. Correspondingly, the instance creation condition may be that the total quantity of created instances of the first SWC is less than 1. In other words, the first SWC may perform step 405 when detecting that the quantity of created instances is 0.

In another optional implementation, the first SWC may schedule a plurality of algorithm instances in parallel, that is, tasks in the plurality of algorithm instances may be executed in each scheduling period. Therefore, in this implementation, the quantity threshold may be an integer greater than 1, for example, may be 3 or 5. Correspondingly, the instance creation condition may include that the total quantity of created instances of the first SWC is less than the quantity threshold. The plurality of algorithm instances that are scheduled in parallel may be created based on one execution flow graph, or may be created based on different execution flow graphs. This is not limited in this embodiment of this application.

In addition, to ensure reliable running of the algorithm instance, the instance creation condition may further include: the embedded device has a resource used to execute a task in the execution flow graph.

If the plurality of algorithm instances that are scheduled in parallel are created based on one execution flow graph, in this implementation, if the first SWC detects that an algorithm instance of an execution flow graph has been created, and the embedded device further has a resource that can execute a task in the execution flow graph, the first SWC may create an algorithm instance again based on the execution flow graph, and schedule and execute a task in the algorithm instance, to improve scheduling efficiency of the algorithm.

Figure 7:
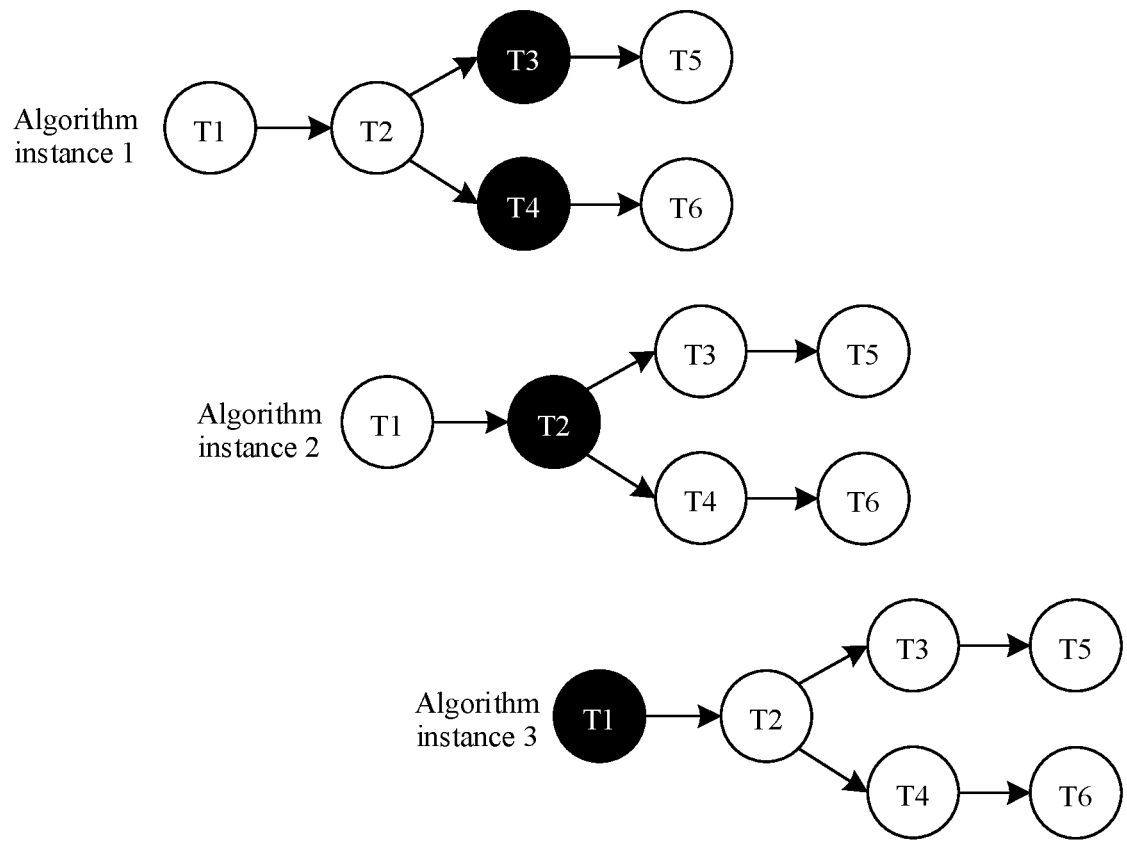
FIG. 7 is a schematic diagram of creating a plurality of algorithm instances based on one execution flow graph, according to an embodiment of this application.

For example, as shown in FIG. 7, it is assumed that an execution flow graph includes six tasks in total: tasks T1 to T6. The first SWC creates an algorithm instance 1 in a first scheduling period based on the execution flow graph, and sequentially schedules and executes the tasks in the algorithm instance 1. If the first SWC detects, in a second scheduling period, that the tasks T1 and T2 in the algorithm instance 1 have been executed and the task T3 is being executed, and detects that a computing unit to which a second SWC configured to execute the tasks T1 and T2 belongs is in an idle state, an algorithm instance 2 may be created based on the execution flow graph, and the task T1 and the task T2 may be executed. If the first SWC detects, in a third scheduling period, that the task T1 in the algorithm instance 2 has been executed, the task T2 is being executed, and the computing unit to which the second SWC configured to execute the task T1 belongs is in the idle state, the first SWC may continue to create an algorithm instance 3 based on the execution flow graph, and may execute the task T1.

The plurality of algorithm instances are scheduled in parallel, that is, the algorithm instances are executed in a pipeline manner, and there is no need to wait for execution of one algorithm instance before creating a new one. Therefore, resource utilization of the embedded device can be effectively improved, an execution period of the algorithm instance can be effectively shortened, to ensure that the algorithm instance can be executed within a specified execution period. In the millimeter-wave radar algorithm, a refresh time of reporting a radar target can be significantly reduced.

Step 405: The first SWC creates the algorithm instance based on the execution flow graph.

In this embodiment of this application, after detecting that the instance creation condition is met, the first SWC may query the memory for the execution flow graph by using the interface provided by the interface function, and create the algorithm instance based on the execution flow graph. The creating the algorithm instance may be: obtaining an address of the execution flow graph and storing the address. Subsequently, when the algorithm instance is scheduled, only data in the execution flow graph needs to be executed based on an address index. In addition, the first SWC may further create a new data structure in the memory, to record an execution status and an execution time of each task. The execution time includes a start time and an end time of the task.

Step 406: The first SWC detects, based on the algorithm instance, whether a target task that meets a scheduling condition exists in the plurality of tasks included in the algorithm.

In this embodiment of this application, after creating the algorithm instance, the first SWC may poll the configuration information of each task based on the algorithm instance, to detect whether the target task that meets the scheduling condition exists in the plurality of tasks. If the first SWC determines that the target task that meets the scheduling condition exists in the plurality of tasks included in the algorithm, step 407 may be performed; or if the first SWC determines that the target task that meets the scheduling condition does not exist in the plurality of tasks included in the algorithm, the operation may be ended.

The scheduling condition may include at least: a status of a task on which the task depends is a finish state. If the configuration information of each task further includes the scheduling information, and the scheduling information includes the resource dependency information, the scheduling condition may further include: a resource indicated by the resource dependency information in the embedded device is in an idle state. The resource may include a memory resource and a computing resource, and the computing resource is a processor resource. If the scheduling information further includes the scheduling constraint information, the scheduling condition may further include: a current runtime environment meets the scheduling constraint information, for example, the current time is a specified start time of a task.

It can be learned with reference to step 404 and step 405 that, after creating the new algorithm instance, the first SWC may detect, based on the algorithm instance, whether the target task that meets the scheduling condition exists in the plurality of tasks included in the algorithm. Alternatively, when detecting that the first SWC does not meet the instance creation condition, the first SWC may determine that the algorithm instance already exists in the processor. Therefore, the first SWC may directly detect whether the target task that meets the scheduling condition exists in the plurality of tasks included in the algorithm.

Step 407: The first SWC schedules the target task to the second SWC.

In this embodiment of this application, after determining the target task that meets the scheduling condition, the first SWC may schedule the target task to the second SWC for execution.

Figure 8:
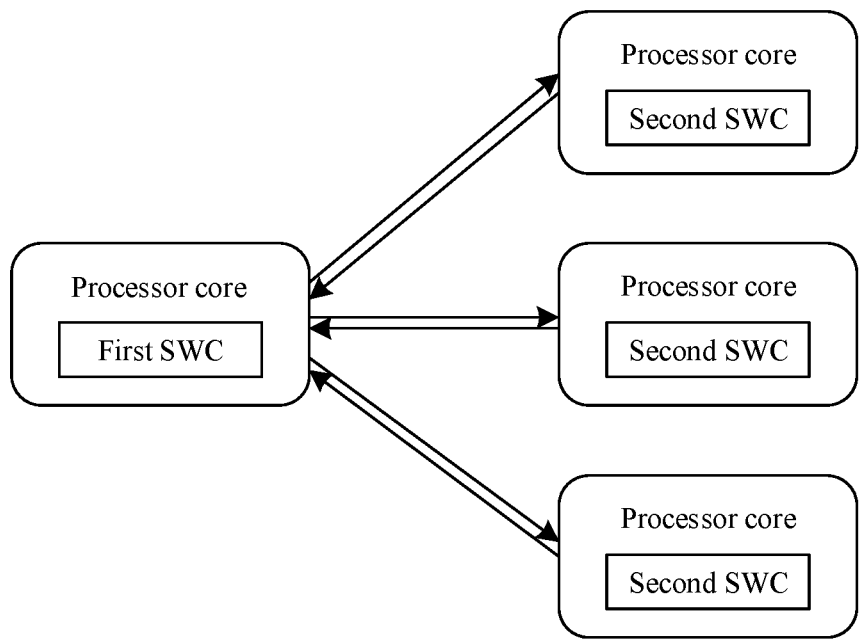
FIG. 8 is a schematic diagram of a software component deployed in a processor, according to an embodiment of this application.

Optionally, a plurality of second SWCs may be pre-deployed in the processor, and each second SWC may be configured to execute a part of the task in the algorithm. In this embodiment of this application, as shown in FIG. 8, the processor may include a plurality of computing units, and each computing unit may be a processor core. In this case, the first SWC may be deployed in one computing unit. For example, to ensure reliability of algorithm deployment and scheduling, the first SWC may be deployed in a computing unit with a relatively high security level. Each second SWC may be deployed in one computing unit, the second SWC and the first SWC are deployed in different computing units, and one or more second SWCs may be deployed in each computing unit.

Figure 9:
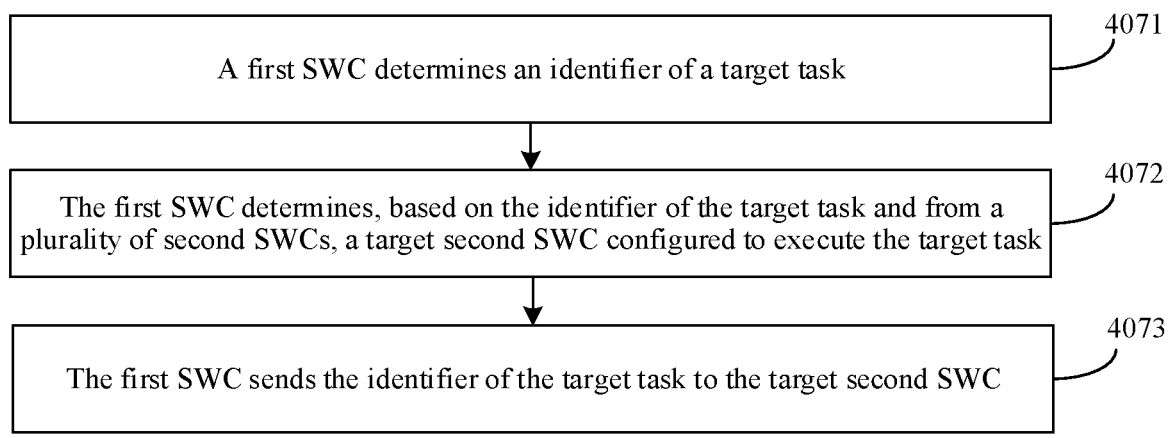
FIG. 9 is a flowchart of a method for scheduling a target task, according to an embodiment of this application.

Correspondingly, as shown in FIG. 9, a process in which the first SWC schedules the target task to the second SWC may include the following steps.

Step 4071: The first SWC determines an identifier of the target task.

An identifier of each task may be a task name of the target task, or may be an identifier (ID) uniquely allocated to each task after the interface function obtains the registration information.

Step 4072: The first SWC determines, based on the identifier of the target task and from the plurality of second SWCs, a target second SWC configured to execute the target task.

In this embodiment of this application, the first SWC may query the execution flow graph for configuration information of the target task, and the configuration information may record an identifier of the computing unit configured to execute the target task. The first SWC may further determine, based on a type of the target task and a correspondence between a type of a pre-stored task and an identifier of the second SWC, the second SWC configured to execute the target task. Alternatively, the first SWC may directly determine, from the configuration information of the target task, the target second SWC configured to execute the target task.

Step 4073: The first SWC sends the identifier of the target task to the target second SWC.

After determining the target second SWC, the first SWC may send the identifier of the target task to the target second SWC.

Step 408: The second SWC executes the target task.

After receiving the identifier of the target task scheduled by the first SWC, the second SWC may query the configuration information of the target task based on the identifier, and determine a storage address of the target task, for example, a function pointer of the target task. Then, the second SWC may execute the target task.

Step 409: The second SWC sends a notification message to the first SWC, where the notification message is used to indicate that the target task is executed.

After executing the target task, the second SWC may send the notification message to the first SWC. Optionally, in this embodiment of this application, communication between the first SWC and the second SWC may be implemented based on an RTE in AUTOSAR. For example, the RTE may implement communication between different SWCs by using a shared memory and an inter-core interrupt.

Step 410: The first SWC updates a status of the target task to a finish state in response to the notification message.

After receiving the notification message sent by the second SWC, the first SWC may update the status of the target task to the finish state in response to the notification message.

Optionally, in this embodiment of this application, the first SWC may further continue to perform step 406 in response to the notification message, to detect whether the target task that meets the scheduling condition exists in the plurality of tasks included in the algorithm. In other words, the second SWC may actively trigger next task scheduling without waiting for a next scheduling period. By comparing with periodically performing task scheduling based on a scheduling period, the active triggering manner can effectively improve task scheduling efficiency.

It should be noted that, in this embodiment of this application, a quantity of second SWCs deployed in the processor may be determined based on a function of the to-be-deployed algorithm. For example, it is assumed that the to-be-deployed algorithm may be divided into N sub-functions, where N is an integer greater than 1. Each sub-function is implemented by one or more tasks, that is, each sub-function may include one or more tasks of a same type. In this case, N second SWCs corresponding to the N sub-functions may be deployed in the processor, and each second SWC may execute each task used to implement one sub-function. The first SWC may store a correspondence between each sub-function (that is, a type of a task) and the identifier of the second SWC.

In conclusion, this embodiment of this application provides the task scheduling method. In the method, the registration information of the algorithm may be obtained and parsed by using the interface function, and the task in the algorithm may be scheduled and executed by using the SWC. In the process of deploying the algorithm and scheduling the task, the developer does not need to perform the complex configuration, so that the algorithm deployment procedure is effectively simplified, and the algorithm deployment efficiency and the task scheduling efficiency are improved. In addition, the interface function may directly store, in the memory, the execution flow graph obtained through parsing, so that the SWC may directly query the memory for the data in the execution flow graph when creating the algorithm instance, without the need to parse the file. Therefore, a task scheduling delay is effectively reduced. Moreover, the SWC configured to implement task scheduling and execution may be pre-deployed in the processor, and the processor does not need to create the process or the thread during running. Therefore, the task scheduling delay may further effectively be reduced.

It can be learned from the foregoing analysis that the task scheduling method provided in this embodiment of this application has a relatively low scheduling delay and relatively high scheduling efficiency, and can meet a requirement of high real-time performance in an in-vehicle scenario.

Figure 10:
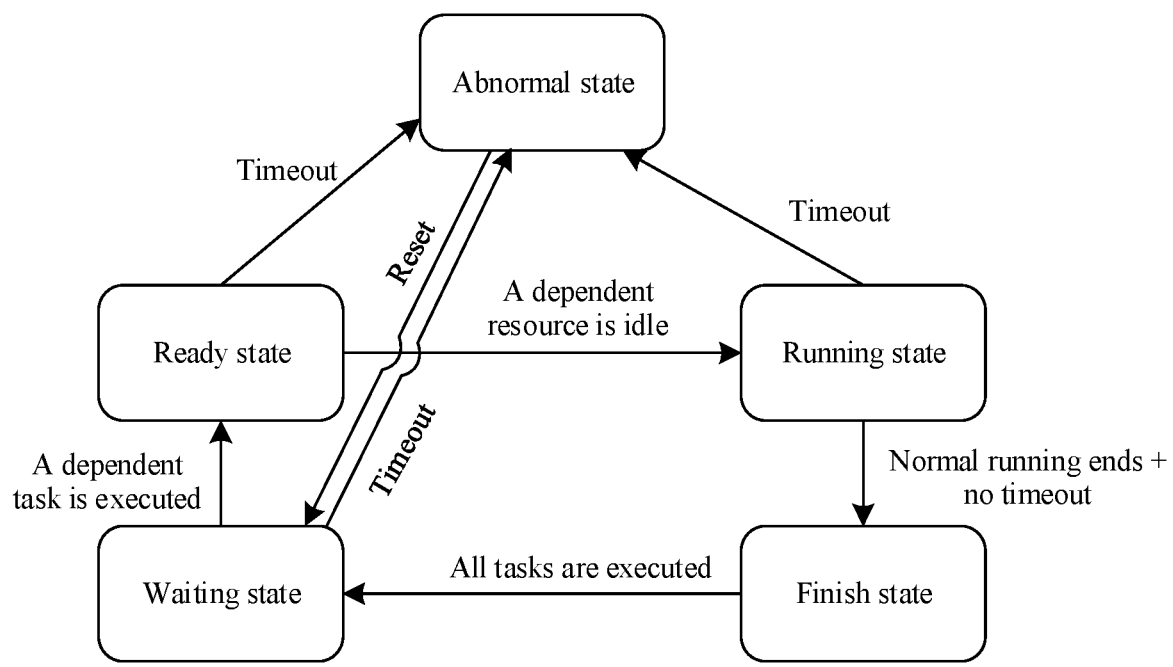
FIG. 10 is a schematic diagram of maintaining a task status, according to an embodiment of this application.

FIG. 10 is a schematic diagram in which a first SWC maintains a task status according to an embodiment of this application. Refer to FIG. 10. It can be learned that after creating an algorithm instance based on an execution flow graph, the first SWC may initialize a status of each task in the algorithm instance to a waiting state. When detecting that a task on which a task depends is executed, the first SWC may update a status of the task to a ready state. Then, after detecting that a resource on which the task depends is idle, that is, a scheduling condition is met and the task is scheduled to a second SWC for execution, the first SWC may update the status of the task to a running state. If the first SWC detects that duration of any state of the task among the waiting state, the ready state, and the running state exceeds specified duration, the first SWC may update the status of the task to an abnormal state. In addition, when detecting a reset command, the first SWC may update the status of the task in the abnormal state to the waiting state. If the first SWC detects that running of a task ends normally and the task does not time out (that is, execution duration of the task does not exceed the duration specified in configuration information), the first SWC may update a status of the task to a finish state. When detecting that all tasks in the algorithm instance are executed (that is, statuses of all the tasks are the finish state), the first SWC may further restore the statuses of all the tasks to the waiting state. Because the first SWC may record a status of each task in a memory, after all the tasks in the algorithm instance are executed, the statuses of all the tasks are restored to the waiting state, so that the memory can be released.

Figure 11:
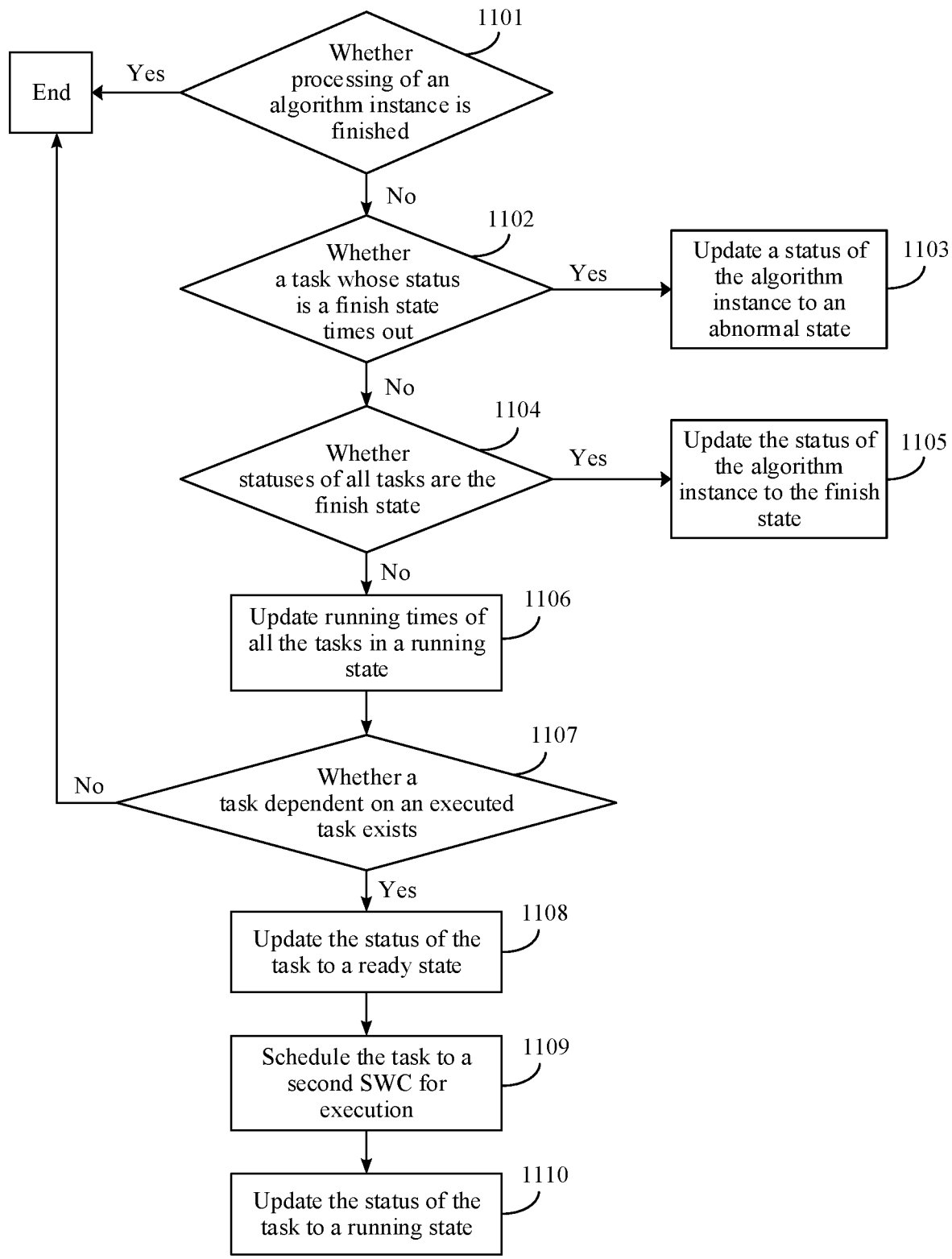
FIG. 11 is a flowchart of another task scheduling method, according to an embodiment of this application.

FIG. 11 is a flowchart of another task scheduling method according to an embodiment of this application. The method may be applied to a first SWC. As shown in FIG. 11, the method may include the following steps.

Step 1101: Detect whether processing of an algorithm instance is finished.

In this embodiment of this application, after creating the algorithm instance, the first SWC may first detect whether the processing of the algorithm instance is finished before scheduling and executing a task in the algorithm instance. For example, the first SWC may detect whether a status of the algorithm instance is a finish state. If it is determined that the processing of the algorithm instance is finished, the first SWC may end the operation; or if it is determined that the processing of the algorithm instance is not finished, the first SWC may continue to perform step 1102.

Step 1102: Detect whether a task whose status is a finish state times out.

The first SWC may continue to detect whether the task whose status is the finish state in the algorithm instance times out, that is, detect whether execution duration of a completed task exceeds maximum running duration specified in configuration information. If the task times out, step 1103 may be performed; or if the task does not time out, step 1104 may be performed.

Step 1103: Update the status of the algorithm instance to an abnormal state.

If the first SWC detects that the task whose status is the finish state times out, the first SWC may update the status of the algorithm instance to the abnormal state.

Step 1104: Detect whether statuses of all tasks are the finish state.

If the first SWC detects that the task whose status is the finish state does not time out, the first SWC may continue to detect whether the statuses of all the tasks are the finish state, that is, detect whether all the tasks in the algorithm instance are finished.

If the statuses of all the tasks are the finish state, step 1105 may be performed; or if the status of any task is not the finish state, step 1106 may be performed.

Step 1105: Update the status of the algorithm instance to the finish state.

If the first SWC detects that the statuses of all the tasks in the algorithm instance are the finish state, the first SWC may determine that all the tasks in the algorithm instance are executed, and therefore may update the status of the algorithm instance to the finish state.

Step 1106: Update running times of all the tasks in a running state.

If the first SWC detects that a status of any task in the algorithm instance is not the finish state, the first SWC may update the running duration of all the tasks in the running state.

Step 1107: Detect whether a task dependent on an executed task exists.

After updating the running time of the task that is in the running state, the first SWC may continue to detect whether the task dependent on the executed task exists in the algorithm instance. If yes, step 1108 may be performed; or if no, the operation may be ended. For an implementation process of step 1107, refer to step 406.

Step 1108: Update the status of the task to a ready state.

If the first SWC detects that all tasks on which a task depends are executed, the first SWC may update a status of the task to the ready state.

Step 1109: Schedule the task to a second SWC for execution.

The first SWC may further schedule the task in the ready state to the second SWC for execution. For an implementation process of step 1109, refer to step 407 and step 408.

Step 1110: Update the status of the task to the running state.

After scheduling the task to the second SWC, the first SWC may update the status of the task to the running state.

Figure 12:
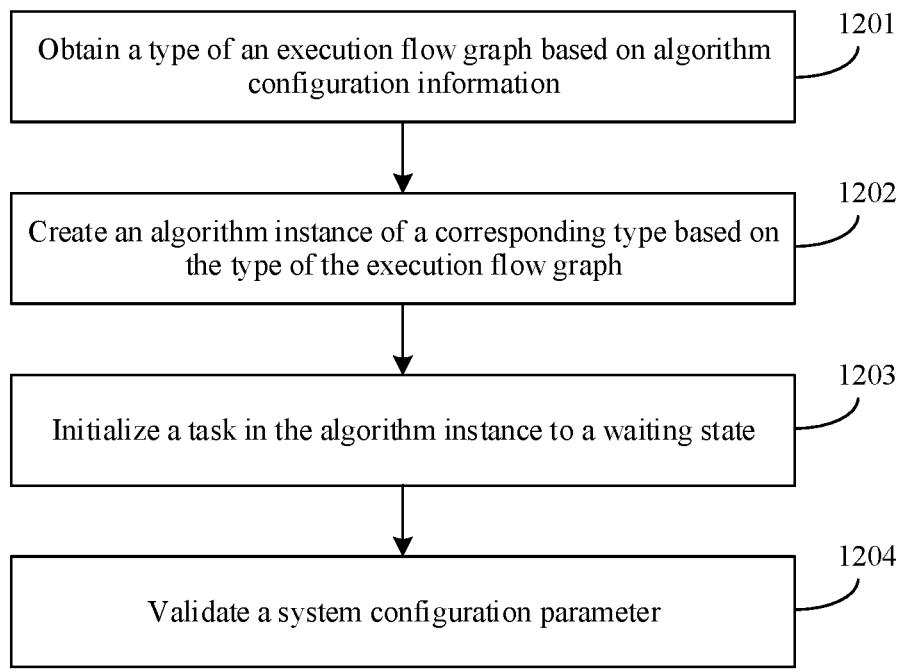
FIG. 12 is a flowchart of a method for creating an algorithm instance, according to an embodiment of this application.

FIG. 12 is a flowchart of a method for creating an algorithm instance according to an embodiment of this application. The method may be applied to a first SWC. As shown in FIG. 12, the method may include the following steps.

Step 1201: Obtain a type of an execution flow graph based on algorithm configuration information.

After detecting that an instance creation condition is met, the first SWC may first determine, based on the algorithm configuration information in a memory, the type of the execution flow graph in which the first SWC can create an instance. The algorithm configuration information may be written into a memory by a developer in advance, or may be externally configured.

Step 1202: Create an algorithm instance of a corresponding type based on the type of the execution flow graph.

The first SWC may query the memory for an execution flow graph of a same type based on the determined type of the execution flow graph, and create the algorithm instance based on the execution flow graph of the type.

Step 1203: Initialize a task in the algorithm instance to a waiting state.

After creating the algorithm instance, the first SWC may initialize statuses of all tasks in the algorithm instance to the waiting state.

Step 1204: Validate a system configuration parameter.

After initializing the status of the task, the first SWC may validate the system configuration parameter. For example, for a millimeter-wave radar algorithm, the system configuration parameter may include an installation location of a radar, an external configuration parameter of the radar.

In conclusion, according to the method provided in this embodiment of this application, the PSF 014 is added between the application layer 011 and the RTE layer 012 of AUTOSAR. The PSF 014 may uniformly manage scheduling and execution of a task in an upper-layer algorithm, so that the following beneficial effects can be implemented.

1. The algorithm is decoupled from an original AUTOSAR framework. That is, the PSF is uniformly responsible for algorithm registration and execution. The algorithm is imperceptive of the AUTOSAR framework, and AUTOSAR does not need to be reconfigured when the algorithm is changed. This effectively improves scalability and evolution of AUTOSAR.

2. The algorithm deployment and update are simple. Algorithm registration can be finished by only updating a registry and invoke a PSF registration interface. In addition, the PSF supports dynamic registration.

3. The algorithm is imperceptive of an execution time sequence and status of the task, so that performance loss caused by unnecessary task wakeup and sleep can be avoided.

4. An underlying hardware resource of an embedded device is fully utilized, and an algorithm execution period is shortened. The PSF may support simultaneous execution of a plurality of algorithm instances in a pipeline scheduling manner. When a previous algorithm instance is not completely executed, a next round of algorithm instance is started, so that the algorithm execution period can be shortened.

An embodiment of this application further provides an embedded device. The embedded device uses AUTOSAR. As shown in FIG. 3, the embedded device includes the memory 10 and the processor 20, the memory 10 stores the interface function 101, and the first SWC 201 and the second SWC 202 are deployed in the processor 20.

The interface function 101 may be used to:

obtain registration information of a to-be-deployed algorithm, where the algorithm includes a plurality of tasks, and the registration information includes: configuration information of each task and relational data used to describe a dependency between the plurality of tasks;

generate a dependency graph of the plurality of tasks based on the relational data, where the dependency graph includes a plurality of nodes, and each node is used to indicate one task; and record, in the memory, a mapping relationship between each node in the dependency graph and configuration information of a task indicated by the node, to obtain an execution flow graph of the algorithm.

The first SWC 201 is configured to: create an algorithm instance based on the execution flow graph, and schedule, based on the algorithm instance, a target task that meets a scheduling condition in the plurality of tasks included in the algorithm to the second SWC 202.

The second SWC 202 may be configured to execute the target task.

For function implementation of the interface function 101, refer to related descriptions of step 401 to step 403 in the foregoing method embodiment. For function implementation of the first SWC 201, refer to related descriptions of step 405 and step 407 in the foregoing method embodiment. For function implementation of the second SWC 202, refer to related descriptions of step 408 in the foregoing method embodiment.

Optionally, the first SWC 201 may be configured to:

if it is determined that the first SWC meets an instance creation condition, create the algorithm instance based on the execution flow graph, where the instance creation condition includes one or more of the following conditions: a total quantity of created instances is less than a quantity threshold; and the embedded device has a resource required to execute the task in the algorithm.

For function implementation of the first SWC 201, refer to related descriptions of step 404 in the foregoing method embodiment.

Optionally, a plurality of second SWCs 202 may be deployed in the processor, and the first SWC 201 may be configured to:

determine, based on the algorithm instance and from the plurality of tasks included in the algorithm, an identifier of the target task that meets the scheduling condition; determine, based on the identifier of the target task and from the plurality of second SWCs, a target second SWC configured to execute the target task; and send the identifier of the target task to the target second SWC.

For function implementation of the first SWC 201, refer to related descriptions of step 4071 to step 4073 in the foregoing method embodiment.

Optionally, the second SWC 202 may be further configured to: send a notification message to the first SWC 201 after the target task is executed, where the notification message is used to indicate that the target task is executed.

Correspondingly, the first SWC 201 may be further configured to update a status of the target task to a finish state in response to the notification message.

For function implementation of the second SWC 202, refer to related descriptions of step 409 in the foregoing method embodiment. For function implementation of the first SWC 201, refer to related descriptions of step 410 in the foregoing method embodiment.

Optionally, the first SWC 201 may be further configured to: detect, based on the algorithm instance and in response to the notification message, whether the target task that meets the scheduling condition exists in the plurality of tasks included in the algorithm.

Optionally, the scheduling condition may include: the embedded device has the resource required to execute the task, and a status of a task on which the task depends is a finish state.

Optionally, the configuration information may include: attribute information of each task and scheduling information of each task; and the interface function 101 may be used to:

record, in the memory, a mapping relationship between each node in the dependency graph and the attribute information of the task indicated by the node, to obtain a task flow graph of the algorithm; and record, in the memory, a mapping relationship between each node in the task flow graph and the scheduling information of the task indicated by the node, to obtain the execution flow graph of the algorithm.

For function implementation of the interface function 101, refer to related descriptions of step 4031 and step 4032 in the foregoing method embodiment.

In conclusion, this embodiment of this application provides the embedded device. The embedded device may obtain and parse the registration information of the algorithm by using the interface function in the memory, and may schedule and execute the task in the algorithm by using the SWC deployed in the processor. In a process of deploying the algorithm and scheduling the task, a developer does not need to perform complex configuration, so that an algorithm deployment procedure is effectively simplified, and algorithm deployment efficiency and task scheduling efficiency are improved. In addition, the interface function may directly store, in the memory, the execution flow graph obtained through parsing, so that the SWC may directly query the memory for data in the execution flow graph when creating the algorithm instance, without a need to parse a file. Therefore, a task scheduling delay is effectively reduced. Moreover, the SWC configured to implement task scheduling and execution may be pre-deployed in the processor, and the processor does not need to create a process or a thread during running. Therefore, the task scheduling delay may further effectively be reduced.

It should be understood that the embedded device provided in this embodiment of this application may be implemented by using an application-specific integrated circuit (ASIC) or a programmable logic device (PLD). The PLD may be a complex programmable logic device (CPLD), a field-programmable gate array (FPGA), generic array logic (GAL), or any combination thereof.

Figure 13:
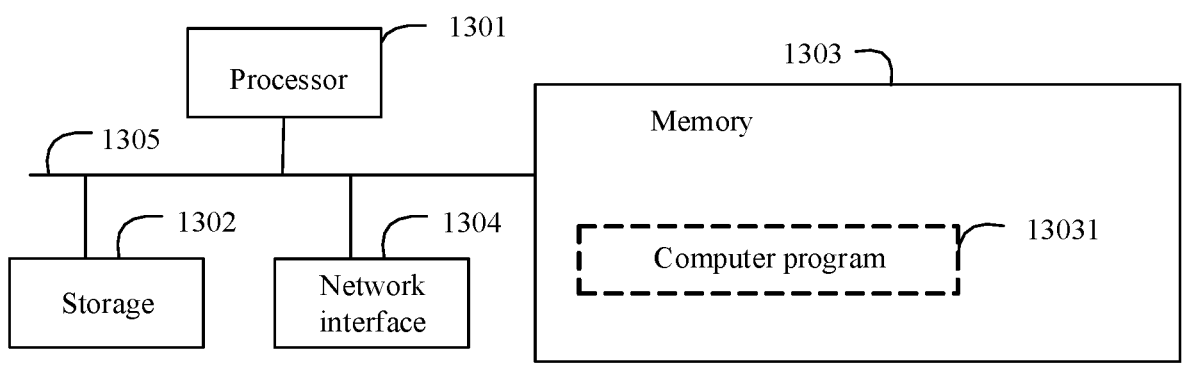
FIG. 13 is a schematic diagram of a structure of another embedded device using AUTOSAR, according to an embodiment of this application.

FIG. 13 is a schematic diagram of a structure of another embedded device according to an embodiment of this application. As shown in FIG. 13, the embedded device may include: a processor 1301, a memory 1302, a storage 1303, a network interface 1304, and a bus 1305. The bus 1305 is configured to connect the processor 1301, the memory 1302, the storage 1303, and the network interface 1304. A communication connection to another device may be implemented through the network interface 1304 (which may be wired or wireless). The storage 1303 stores a computer program 13031, and the computer program 13031 is used to implement various application functions.

It should be understood that in this embodiment of this application, the processor 1301 may be a CPU, or the processor 1301 may be another general-purpose processor, a digital signal processor (DSP), an application-specific integrated circuit (ASIC), a field-programmable gate array (FPGA), a GPU or another programmable logic device, a discrete gate or transistor logic device, a discrete hardware component, or the like. The general-purpose processor may be a microprocessor, any conventional processor, or the like.

The memory 1303 may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through example but not limitative description, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (DR RAM).

In addition to a data bus, the bus 1305 may further include a power bus, a control bus, a status signal bus, and the like. However, for clear description, various buses are marked as the bus 1305 in the figure.

The processor 1301 is configured to execute an interface function in the memory 1302 and the computer program stored in the storage 1303. The processor 1301 executes the interface function and the computer program 13031 to implement the method shown in the foregoing method embodiment.

An embodiment of this application further provides a computer-readable storage medium. The computer-readable storage medium stores instructions, and when the computer-readable storage medium is run on an embedded device, the embedded device is enabled to perform the method shown in the foregoing method embodiment.

An embodiment of this application further provides a computer program product including instructions. When the computer program product runs on an embedded device, the embedded device is enabled to perform the method shown in the foregoing embodiment.

An embodiment of this application further provides a chip. The chip includes a programmable logic circuit and/or program instructions, and when running, the chip is configured to implement the task scheduling method provided in the foregoing aspect.

It should be understood that "and/or" mentioned in embodiments of this application indicates that there may be three relationships, for example, A and/or B may indicate that only A exists, both A and B exist, and only B exists. The character "/" generally indicates an "or" relationship between the associated objects.

A person of ordinary skill in the art may understand that all or some of the steps of embodiments may be implemented by hardware or a program instructing related hardware. The program may be stored in a computer-readable storage medium. The storage medium may be a read-only memory, a magnetic disk, an optical disc, or the like.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A task scheduling method, comprising:
obtaining, by an embedded device using AUTomotive Open System ARchitecture (AUTOSAR) and an interface function, registration information of a to-be-deployed algorithm, wherein the algorithm comprises a plurality of tasks, and wherein the registration information comprises configuration information of each task and relational data used to describe a dependency between the plurality of tasks;
generating, by the embedded device via the interface function, a dependency graph of the plurality of tasks based on the relational data, wherein the dependency graph comprises a plurality of nodes; and each node is used to indicate one task;
recording, by the embedded device via the interface function, a mapping relationship between each node in the dependency graph and configuration information of a task indicated by the node to obtain an execution flow graph of the algorithm;
creating, by the embedded device via a first software component, an algorithm instance based on the execution flow graph;
scheduling, by the embedded device via the first software component based on the algorithm instance, a target task that meets a scheduling condition in the plurality of tasks comprised in the algorithm to a second software component;
executing, by the embedded device via the second software component, the target task;
sending, by the embedded device via the second software component, a notification message to the first software component after the second software component executes the target task, wherein the notification message is used to indicate that the target task is executed; and updating, by the embedded device via the first software component, a status of the target task to a finish state in response to the notification message.

2. The method according to claim 1, wherein the creating, by the embedded device via the first software component, an algorithm instance based on the execution flow graph comprises:

in response to the first software component determining that the first software component meets an instance creation condition, creating the algorithm instance based on the execution flow graph, wherein the instance creation condition comprises one or more of the following conditions:

a total quantity of created instances of the first software component is less than a quantity threshold; and the embedded device has a resource required to execute the task in the algorithm.

3. The method according to claim 2, wherein a plurality of second software components are deployed in the embedded device and the scheduling, by the embedded device via the first software component based on the algorithm instance, a target task that meets a scheduling condition in the plurality of tasks comprised in the algorithm to the second software component comprises:

determining, by the embedded device via the first software component based on the algorithm instance and from the plurality of tasks comprised in the algorithm, an identifier of the target task that meets the scheduling condition;

determining, by the embedded device via the first software component based on the identifier of the target task and from the plurality of second software components, a target second software component executed by the processor to execute the target task; and sending, by the embedded device via the first software component, the identifier of the target task to the target second software component.

4. The method according to claim 1, wherein before the scheduling, by the embedded device via the first software component based on the algorithm instance, a target task that meets a scheduling condition in the algorithm to the second software component, the method further comprises:

detecting, by the embedded device via the first software component based on the algorithm instance and in response to the notification message, whether the target task that meets the scheduling condition exists in the plurality of tasks comprised in the algorithm.

5. The method according to claim 1, wherein the scheduling condition comprises:

the embedded device having the resource required to execute the task; and a status of a task on which the task depends is a finish state.

6. The method according to claim 1, wherein the configuration information comprises:

attribute information of each task and scheduling information of each task; and the recording, by the embedded device via the interface function, a mapping relationship between each node in the dependency graph and configuration information of a task indicated by the node; to obtain an execution flow graph of the algorithm comprises:

recording, by the embedded device via the interface function, a mapping relationship between each node in the dependency graph and the attribute information of the task indicated by the node; to obtain a task flow graph of the algorithm; and recording, by the embedded device via the interface function, a mapping relationship between each node in the task flow graph and the scheduling information of the task indicated by the node to obtain the execution flow graph of the algorithm.

7. An embedded device using AUTomotive Open System ARchitecture (AUTOSAR), wherein the embedded device comprises a memory and a processor, and wherein the memory stores an interface function, and wherein a first software component and a second software component are deployed in the processor and wherein:

the interface function is executed by the processor to:

obtain registration information of a to-be-deployed algorithm, wherein the algorithm comprises a plurality of tasks, and wherein the registration information comprises configuration information of each task and relational data used to describe a dependency between the plurality of tasks;

generate a dependency graph of the plurality of tasks based on the relational data, wherein the dependency graph comprises a plurality of nodes; and each node is used to indicate one task; and record, in the memory, a mapping relationship between each node in the dependency graph and configuration information of a task indicated by the node; to obtain an execution flow graph of the algorithm; and wherein the first software component is executed by the processor to create an algorithm instance based on the execution flow graph, and schedule, based on the algorithm instance, a target task that meets a scheduling condition in the plurality of tasks comprised in the algorithm to the second software component; and wherein the second software component is executed by the processor to execute the target task;

wherein the second software component is further executed by the processor to:

send a notification message to the first software component after the target task is executed, wherein the notification message is used to indicate that the target task is executed; and update a status of the target task to a finish state in response to the notification message.

8. The device according to claim 7, wherein the first software component is further executed by the processor to:

in response to being determined that the first software component meets an instance creation condition, create the algorithm instance based on the execution flow graph, wherein the instance creation condition comprises one or more of the following conditions:

a total quantity of created instances is less than a quantity threshold; and the embedded device has a resource required to execute the task in the algorithm.

9. The device according to claim 7, wherein:

a plurality of second software components are deployed in the processor and the first software component is further executed by the processor to:

determine, based on the algorithm instance and from the plurality of tasks comprised in the algorithm, an identifier of the target task that meets the scheduling condition;

determine, based on the identifier of the target task and from the plurality of second software components, a target second software component configured to execute the target task; and send the identifier of the target task to the target second software component.

10. The device according to claim 7, wherein the first software component is further executed by the processor to:
    detect, based on the algorithm instance and in response to the notification message, whether the target task that meets the scheduling condition exists in the plurality of tasks comprised in the algorithm.

11. The device according to claim 7, wherein the scheduling condition comprises:
    the embedded device having the resource required to execute the task and a status of a task on which the task depends is a finish state.

12. The device according to claim 7, wherein the configuration information comprises attribute information of each task and scheduling information of each task and the interface function is further executed by the processor to:
    record, in the memory, a mapping relationship between each node in the dependency graph and the attribute information of the task indicated by the node; to obtain a task flow graph of the algorithm; and
    record, in the memory, a mapping relationship between each node in the task flow graph and the scheduling information of the task indicated by the node-to obtain the execution flow graph of the algorithm.

13. A non-transitory computer-readable storage medium, wherein the computer-readable storage medium stores instructions, and in response to the computer-readable storage medium being run on an embedded device, the embedded device is enabled to perform the following:
    obtaining, using AUTomotive Open System ARchitecture (AUTOSAR) and an interface function, registration information of a to-be-deployed algorithm, wherein the algorithm comprises a plurality of tasks, and wherein the registration information comprises configuration information of each task and relational data used to describe a dependency between the plurality of tasks;
    generating, by the embedded device via the interface function, a dependency graph of the plurality of tasks based on the relational data, wherein the dependency graph comprises a plurality of nodes and each node is used to indicate one task,
    recording, by the embedded device via the interface function, a mapping relationship between each node in the dependency graph and configuration information of a task indicated by the node to obtain an execution flow graph of the algorithm;
    creating, by the embedded device via a first software component, an algorithm instance based on the execution flow graph;
    scheduling, by the embedded device via the first software component based on the algorithm instance, a target task that meets a scheduling condition in the plurality of tasks comprised in the algorithm to a second software component;
    executing, by the embedded device via the second software component, the target task;
    sending, by the embedded device via the second software component, a notification message to the first software component after the second software component executes the target task, wherein the notification message is used to indicate that the target task is executed; and
    updating, by the embedded device via the first software component, a status of the target task to a finish state in response to the notification message.

14. The non-transitory computer-readable storage medium according to claim 13, wherein the creating, by the embedded device via the first software component, an algorithm instance based on the execution flow graph comprises:
    in response to the first software component determining that the first software component meets an instance creation condition, creating the algorithm instance based on the execution flow graph, wherein the instance creation condition comprises one or more of the following conditions:
    a total quantity of created instances of the first software component is less than a quantity threshold; and
    the embedded device has a resource required to execute the task in the algorithm.

15. The non-transitory computer-readable storage medium according to claim 14, wherein a plurality of second software components are deployed in the embedded device and the scheduling, based on the algorithm instance, a target task that meets a scheduling condition in the plurality of tasks comprised in the algorithm to the second software component comprises:
    determining, based on the algorithm instance and from the plurality of tasks comprised in the algorithm, an identifier of the target task that meets the scheduling condition;
    determining, based on the identifier of the target task and from the plurality of second software components, a target second software component configured to execute the target task; and
    sending the identifier of the target task to the target second software component.

16. The non-transitory computer-readable storage medium according to claim 13, wherein before the scheduling, based on the algorithm instance, a target task that meets a scheduling condition in the algorithm to the second software component, the embedded device is further enabled to perform the following:
    detecting, based on the algorithm instance and in response to the notification message, whether the target task that meets the scheduling condition exists in the plurality of tasks comprised in the algorithm.

17. The non-transitory computer-readable storage medium according to claim 13, wherein the scheduling condition comprises:
    the embedded device having the resource required to execute the task and a status of a task on which the task depends is a finish state.

* * * * *